(12) United States Patent
Hwang et al.

(10) Patent No.: US 7,576,783 B2
(45) Date of Patent: Aug. 18, 2009

(54) CONFIDENCE BASED WEIGHTING FOR COLOR INTERPOLATION

(76) Inventors: Hau Hwang, 8148 Genesee Ave., #34, San Diego, CA (US) 92122;
King-Chung Lai, 11440 Pochard Way, San Diego, CA (US) 92131;
Ananthapadmanabhan Kandhadai, 12526 Heatherton Ct., #183, San Diego, CA (US) 92128

( * ) Notice: Subject to any disclaimer, the term of this patent is extended or adjusted under 35 U.S.C. 154(b) by 804 days.

(21) Appl. No.: 11/051,159

(22) Filed: Feb. 4, 2005

(65) Prior Publication Data

US 2006/0176375 A1    Aug. 10, 2006

(51) Int. Cl.
*H04N 5/228* (2006.01)
(52) U.S. Cl. ............. 348/222.1; 348/272; 382/300
(58) Field of Classification Search ......... 348/222.1, 348/272, 347; 382/300
See application file for complete search history.

(56) References Cited

U.S. PATENT DOCUMENTS

| | | | |
|---|---|---|---|
| 5,652,621 A | | 7/1997 | Adams, Jr. et al. |
| 6,091,862 A | * | 7/2000 | Okisu ............ 382/300 |
| 6,654,492 B1 | * | 11/2003 | Sasai ............. 382/162 |
| 2001/0005429 A1 | * | 6/2001 | Ishiga et al. ........ 348/222 |
| 2003/0052981 A1 | * | 3/2003 | Kakarala et al. ...... 348/272 |

FOREIGN PATENT DOCUMENTS

| | | |
|---|---|---|
| EP | 1109411 A1 | 6/2001 |
| EP | 1289310 A2 | 3/2003 |

OTHER PUBLICATIONS

International Search Report PCT/US2006/004247, International Search Authority European Patent Office, Jul. 5, 2006.
International Preliminary Report on Patentability PCT/US2006/004247 IB Switzerland, Aug. 7, 2007.
Written Opinion PCT/US/2006/004247, International Search Authority European Patent Office Aug. 4, 2007.

* cited by examiner

*Primary Examiner*—Lin Ye
*Assistant Examiner*—Gevell Selby
(74) *Attorney, Agent, or Firm*—Espartaco Diaz Hidalgo; Kyong H. Macek

(57) ABSTRACT

A color interpolation method uses a first interpolation function (F1) to obtain a first missing color sub-pixel value for a pixel of interest and uses a second interpolation function (F2) to obtain a second missing color sub-pixel value for the pixel of interest. First metric (V) indicative of an edge extending in a first direction (D1) is obtained. Second metric (H) indicative of an edge extending in a second direction (D2) is obtained. The two metrics are used to generate first and second weighting factors (k1, k2). A confidence factor value can be used to place more emphasis on one metric versus the other metric in the determination of the weighting factors. In one embodiment, the sub-pixel value being interpolated is the weighted sum of the first weighting factor multiplied by the first missing color sub-pixel value plus the second weighting factor multiplied by the second missing color sub-pixel value.

20 Claims, 5 Drawing Sheets

GREEN SUB-PIXEL INTERPOLATION

BAYER PATTERN
| R11 | G12 | R13 | G14 | R15 | G16 |
| G21 | B22 | G23 | B24 | G25 | B26 |
| R31 | G32 | R33 | G34 | R35 | G36 |
| G41 | B42 | G43 | B44 | G45 | B46 |
| R51 | G52 | R53 | G54 | R55 | G56 |
FIG. 1
(PRIOR ART)
INTERPOLATED IMAGE
FIG. 2
(PRIOR ART)
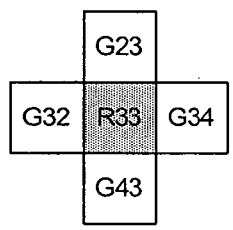
FIG. 3
(PRIOR ART)
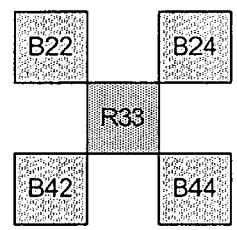
FIG. 4
(PRIOR ART)
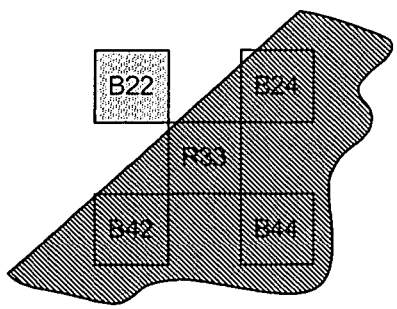
FIG. 5
(PRIOR ART)

BAYER PATTERN

| R11 | G12 | R13 | G14 | R15 | G16 |
| G21 | B22 | G23 | B24 | G25 | B26 |
| R31 | G32 | R33 | G34 | R35 | G36 |
| G41 | B42 | G43 | B44 | G45 | B46 |
| R51 | G52 | R53 | G54 | R55 | G56 |

PIXEL LOCATION OF INTEREST

FIG. 6

INTERPOLATED IMAGE

THREE COLOR SUB-PIXEL VALUES PER PIXEL LOCATION

FIG. 7

FIRST INTERPOLATION FUNCTION INTERPOLATES ALONG A FIRST LINE IN A FIRST DIRECTION

| R11 | G12 | R13 | G14 | R15 | G16 |
| G21 | B22 | G23 | B24 | G25 | B26 |
| R31 | G32 | R33 | G34 | R35 | G36 |
| G41 | B42 | G43 | B44 | G45 | B46 |
| R51 | G52 | R53 | G54 | R55 | G56 |

FIG. 8

SECOND INTERPOLATION FUNCTION INTERPOLATES ALONG A SECOND LINE IN A SECOND DIRECTION

| R11 | G12 | R13 | G14 | R15 | G16 |
| G21 | B22 | G23 | B24 | G25 | B26 |
| R31 | G32 | R33 | G34 | R35 | G36 |
| G41 | B42 | G43 | B44 | G45 | B46 |
| R51 | G52 | R53 | G54 | R55 | G56 |

FIG. 9

DETERMINATION OF WEIGHTING FACTOR k1

GREEN SUB-PIXEL INTERPOLATION

CONFIDENCE BASED WEIGHTING FOR COLOR INTERPOLATION

BACKGROUND

1. Field

The disclosed embodiments relate generally to color interpolation.

2. Background

A digital image capture device, such as a digital camera or cell phone that has the ability to capture a digital image, includes an image sensor. The image sensor includes a two dimensional array of sensors. Each sensor is said to be located at a "pixel location." Each sensor detects the intensity of one color of light. Typically, there are sensors for green, sensors for red, and sensors for blue.

FIG. 1 (Prior Art) is a diagram of an image sensor whose sensors are arranged in a popular pattern called the Bayer pattern. Due to the way humans visualize colors and images, it is often advantageous for the image sensor to subsample red and blue with respect to the sampling of green. Note that the uppermost row of sensors includes green and red sensors, in alternating fashion. The next row of sensors includes green and blue sensors, in alternating fashion. This ordering of sensors occurs row by row, vertically down the rows of the image sensor. Accordingly, the image sensor of FIG. 1 has more green sensors than it does red sensors or blue sensors. Red and blue are therefore said to be subsampled. Only one color sample value is taken at each pixel location on the image sensor. Each color sample value may, for example, be an eight-bit value.

FIG. 2 is a simplified diagram of a display usable to render an image captured using the image sensor of FIG. 1. For each sensor in FIG. 1, there are three sub-pixel values displayed on the display in FIG. 2. There is a green sub-pixel value, a red sub-pixel value, and a blue sub-pixel value. Each sub-pixel color value may, for example, be an eight-bit value. Because only one color is sampled at each pixel location in the Bayer pattern image sensor, two additional sub-pixel color values need to be determined for each pixel location in order to have all three sub-pixel values at each pixel location. The sub-pixel values that need to be determined are said to be "missing" sub-pixel values. The process of recreating the missing color sub-pixel values is called "demosaicing" or "color interpolation".

FIG. 3 (Prior Art) illustrates one simple conventional color interpolation method. Suppose the current pixel location is location R33. Assume that the sub-pixel value for green is to be determined for location R33 because the Bayer pattern image sensor only captured a red sample value at location R33. Immediately above pixel location R33, immediately below location R33, immediately to the left of R33, and immediately to the right of R33 are pixel locations with green sub-pixel sample values. To determine the green sub-pixel value for pixel location R33, the neighboring green sub-pixel sample values G23, G32, G34, and G43 are averaged. The result is an estimate of what the green sub-pixel value should be at red pixel location R33.

FIG. 4 (Prior Art) illustrates how the blue sub-pixel value for pixel location R33 is determined. Note from FIG. 1 that the Bayer pattern image sensor generates blue sub-pixel sample values at the neighboring diagonal pixel locations B22, B24, B42 and B44. These neighboring diagonal blue sub-pixel sample values are averaged to get an estimate of what the blue sub-pixel value should be at red pixel location R33.

FIG. 5 (Prior Art) illustrates a problem with the color interpolating method of FIGS. 3 and 4. Suppose the image to be displayed includes an object 1 of solid red. Object 1 is disposed on a background of solid blue. Object 1 therefore creates a diagonal edge 2 that runs across the area of pixel location R33. There is solid blue above and to the left of edge 2. There is solid red below and to the right of edge 2. If the nearest neighboring four diagonal blue pixel values were just averaged as set forth above in FIG. 4 to interpolate the missing blue sub-pixel value at location R33, then the color values on either side of edge 2 would be averaged. This would result in a mixing of the large blue values on one side of the edge with the small blue values on the other side of the edge. Performing color interpolation using this mixing would reduce the sharpness of the edge.

To remedy this problem, it is common to obtain metrics of the amount of vertical edge there is at a pixel location and of the amount of horizontal edge there is at a pixel location. If an edge is determined to be present, then the metrics are used to estimate the orientation of the edge. Once an estimate of the orientation of the edge is made, then an appropriate interpolation function is chosen that does not result in undesirable mixing across the edge.

Suppose, for example, that a metric is obtained of how much edge there is in the vertical dimension and that another metric is obtained of how much edge there is in the horizontal dimension. If the metrics indicate that there is more vertical edge than horizontal edge, then an interpolation function is applied that does not average pixel values in the horizontal dimension. Averaging across the vertically extending edge therefore tends to be small. Similarly, if the metrics indicate that there is more horizontal than vertical edge, then an interpolation function is applied that does not average pixel values in the vertical dimension. Averaging across the horizontally extending edge therefore tends to be small. By using the metrics to choose the appropriate interpolation function, edge sharpness in the final image is maintained.

Different types of metrics can be used. One example of a metric is a first order gradient. An example of a first order horizontal gradient might involve subtracting the pixel value to the left from the pixel value of the adjacent pixel value to the right. If this difference value is zero, then no horizontal gradient is detected in the horizontal dimension between the two pixel locations. If the value is large, then a large horizontal gradient is detected. Such a first order gradient detects a change in pixel values in a string of pixel values extending in a direction. First order gradients are therefore usable as metrics to detect edges. A first order gradient for the vertical dimension can be obtained, and a first order gradient for the horizontal dimension can be obtained. These two first order gradients are then used to make a determination of whether an edge is present and if so, what the orientation of the edge is.

Another example of a metric is a second order gradient. A second order gradient involves detecting not the changes in pixel values in a direction, but rather involves detecting how the change in pixel values is changing. The differences between successive pixels are taken extending in a direction. If the magnitudes of these successive difference values do not change, then the second order gradient in the direction is zero. If, on the other hand, the magnitudes of the difference values change, then there is a second order change in the direction. A second order gradient can, for example, be used to eliminate constant changes from the determination of whether an edge is present.

In addition to the first and second order gradients described above, other vertical metrics and horizontal metrics are also used in conventional color interpolation. But regardless of the type of metric, metrics are generally used to select a single best interpolation function. This is undesirable in certain situations because the other interpolation function may be almost as good as the interpolation function chosen. Consider, for example, the situation in which a metric of ten is obtained in the vertical dimension and a metric of nine is obtained in the horizontal dimension. The two metrics are close to one another, yet only the vertical interpolation function is used because it is determined to be better than the horizontal interpolation function.

Another technique involves determining a dominant orientation of directional energy in an area surrounding a pixel to be interpolated. U.S. Pat. No. 6,404,918 describes a method wherein a neighborhood of pixels is considered. The interpolated pixel value is a weighted sum, where each neighborhood pixel is multiplied by its own weighting factor. Each weighting factor is determined by taking a vector dot product of a vector to the neighborhood pixel and the dominant orientation vector. Performing a vector dot product computation generally involves performing a multiply. Many multiply operations are required to calculate just one interpolated pixel value. The dominant orientation vector method is therefore undesirable in certain applications. The computational complexity may, for example, require additional hardware in order for all the needed computations to be performed in an available amount of time. Furthermore, performing the many computations may consume a non-trivial amount of energy. In a battery-powered consumer device such as a cell phone, extending battery life and reducing complexity and cost are often principal concerns. A solution is desired.

SUMMARY

A color interpolation method involves using a first color interpolation function F1 to obtain a first missing color sub-pixel value for a pixel of interest. This first color interpolation function may, for example, be a vertical interpolation function that uses information of pixels disposed along a first line L1 that extends in a first direction D1 through the pixel of interest. First direction D1 can be the vertical direction. The first color interpolation function F1 can be a color difference function that determines the first missing color sub-pixel value such that a substantially constant color difference exists for the pixels disposed along the first line.

A second color interpolation function F2 is used to obtain a second missing color sub-pixel value for the pixel of interest. This second color interpolation function may, for example, be a horizontal interpolation function that uses information of pixels disposed along a second line L2 that extends in a second direction D2 through the pixel of interest. Second direction D2 can be the horizontal direction. The second color interpolation function F2 can be a color difference function that determines the second missing color sub-pixel value such that a substantially constant color difference exists for the pixels disposed along the second line.

A first metric V indicative of the presence (at the pixel of interest) of an edge extending in the first direction D1 is obtained.

A second metric H indicative of the presence (at the pixel of interest) of an edge extending in the second direction D2 is obtained.

In a first aspect, the two metrics V and H are used to generate first and second weighting factors k1 and k2. A confidence factor value can be used in the determination of the weighting factors such that more emphasis is placed on one metric versus the other metric. The missing color sub-pixel value being interpolated is the weighted sum of the first weighting factor k1 multiplied by the first missing color sub-pixel value plus the second weighting factor k2 multiplied by the second missing color sub-pixel value. Accordingly, only a relatively small number of full multiplication operations around two or three is required in order to perform the color interpolation function and to generate the missing color sub-pixel value.

In a second aspect, two weighting factors are not calculated but yet the very same missing color sub-pixel value is determined. For example, a difference between the first missing color sub-pixel value and the second missing color sub-pixel value is multiplied by a value. The value is a function of the first and second metrics. The result of this multiplication is a first product. A sum of the first missing color sub-pixel value and the second missing color sub-pixel value is obtained. A simple shift is performed on this sum to perform a simple multiply by one half operation. The result of the shift operation is a second product. The first and second products are then summed to obtain the missing color sub-pixel value. Only one full multiplication operation is required to perform the color interpolation function in accordance with this second aspect. The shift operation is not considered a full multiplication because it can only multiply or divide by a power of two. In comparison to a full multiplication which involves a full hardware multiplier, however, the shift operation is easily implemented in hardware by shifting bit lines.

Regardless of whether the calculation of the missing color sub-pixel value involves determining two different weighting factors or not, the calculation involves generating a value substantially equal to a weighted sum, where the weighted sum has a first missing color sub-pixel value component and a second missing color sub-pixel value component, and where a relative proportion of the first missing color sub-pixel value component versus the second missing color sub-pixel value component is a function of the first and second metrics. If, for example, the first metric predominates over the second metric, then the first missing color sub-pixel value component predominates (in the interpolated missing color sub-pixel value) over the second missing color sub-pixel value component.

The above-described interpolation method of determining a missing color sub-pixel value is applied to all the red and all the blue pixel locations of a Bayer format array of pixel locations. As a result, a green color sub-pixel value is determined for each pixel location of the Bayer format array. At green pixel locations, the green sub-pixel value is already known because it is the green sub-pixel value from the Bayer array data. At red and blue pixel locations, the interpolation method is used to calculate the green sub-pixel values. Once green sub-pixel values are known for all the pixel locations, then the other red and blue missing color sub-pixel values to be interpolated can be calculated using the known green sub-pixel values.

In another aspect, a green sub-pixel value is not calculated for each of the pixel locations of the array before the calculation of missing red and missing blue sub-pixel values begins. The calculation of a red or blue missing color sub-pixel value only requires green sub-pixel values in an area immediately adjacent to the pixel location of interest. Accordingly, the calculation of green sub-pixel values occurs so that the pixel of interest (for purposes of calculating green sub-pixel values) passes through the array of pixel locations. The calculation of red and blue sub-pixel values occurs in a similar fashion with the pixel of interest (for purposes of calculating red and blue sub-pixel values) moving through the array of pixel locations. The pixel of interest for purposes of calculating red and blue sub-pixel values, however, lags the pixel of interest for purposes of calculating green sub-pixel values. As a consequence, previously generated green sub-pixel values are buffered and made available for use in the following calculation of red and blue sub-pixel values.

Both software and hardware embodiments are described in the detailed description below. This summary does not purport to define the invention. The invention is defined by the claims.

BRIEF DESCRIPTION OF THE DRAWINGS

FIG. 1 (Prior Art) is a diagram of an image sensor whose sensors are arranged in a popular pattern called the Bayer pattern.

FIG. 2 (Prior Art) is a simplified diagram of a display usable to render an image captured using the image sensor of FIG. 1.

FIG. 3 (Prior Art) illustrates one simple conventional color interpolation method.

FIG. 4 (Prior Art) illustrates how the blue sub-pixel value for pixel location R33 is determined in the conventional color interpolation method of FIG. 3.

FIG. 5 (Prior Art) illustrates a problem with the color interpolating method of FIGS. 3 and 4.

FIG. 6 is a simplified diagram of an image sensor whose sensors are arranged in a Bayer pattern in accordance with a novel color interpolation method.

FIG. 7 is a simplified diagram that illustrates the sub-pixel values to be generated by the novel color interpolation method.

FIG. 8 is a diagram that shows the first line of the first color interpolation function.

FIG. 9 is a diagram that shows the second line of the second color interpolation function.

DETAILED DESCRIPTION

Figure 10:
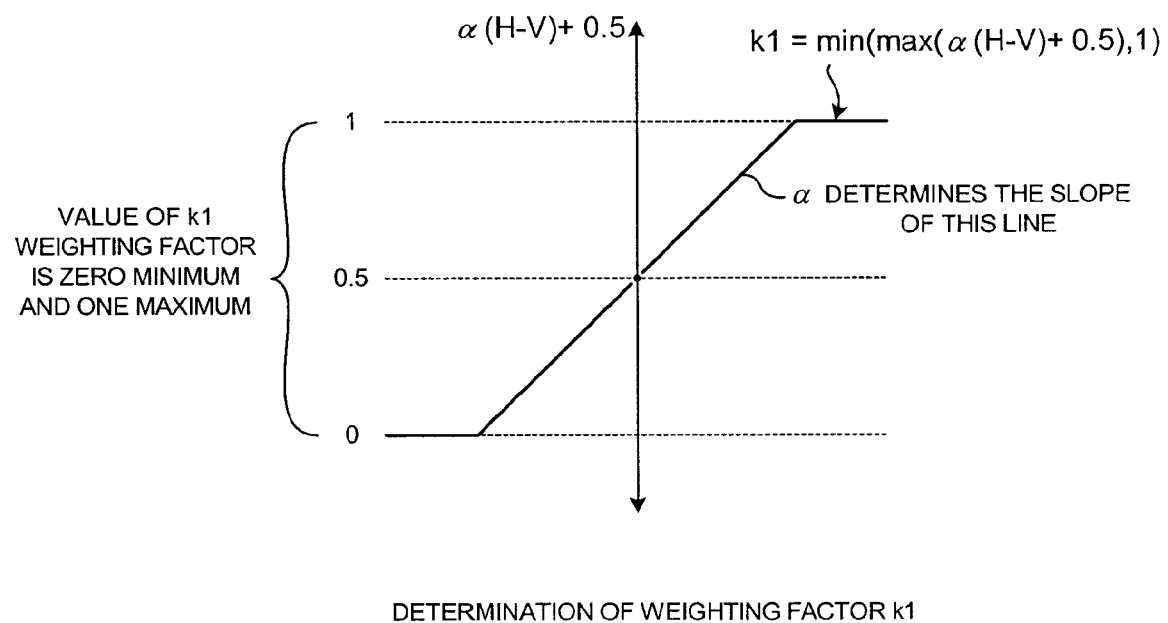
FIG. 10 illustrates operation of an equation usable to determine the first weighting factor k1.

FIG. 6 is a simplified diagram of an image sensor whose sensors are arranged in a Bayer pattern. The image sensor involves a two-dimensional array of color sensors arranged in rows and column. Each color sensor detects one color at one pixel location. In the present example, each color sensor generates an eight-bit color sub-pixel value. A "Gnm" notation is used to designate a color sub-pixel value in FIG. 6. In the notation, the leading capital letter indicates the color being sensed. If the letter is an "R", the color being sensed is red. If the letter is a "G", the color being sensed is green. If the letter is a "B", the color being sensed is blue. This first letter is followed in the notation by two numerals "nm". The first numeral "n" in the notation designates the row of the sub-pixel value. The second numeral "m" in the notation designates the column of the sub-pixel value.

FIG. 7 is a simplified diagram that illustrates the sub-pixel values to be generated by the novel color interpolation method described. For each pixel location, three color sub-pixel values are needed: a red color sub-pixel value, a green color sub-pixel value, and a blue color sub-pixel value. At each pixel location, one of the color sub-pixel values is output by the image sensor as illustrated in FIG. 6. The other two color sub-pixel values are to be determined in accordance with the novel method. The color sub-pixel values to be determined are called "missing color sub-pixel values". Although the red, green and blue sub-pixel values are arranged in a particular way in FIG. 7 in order to clarify the relationship between the three color sub-pixel values in FIG. 7 and the corresponding pixel location in FIG. 6, it is understood that the color sub-pixel values can be packed together in different ways. On a typical display device, color sub-pixels corresponding to the sub-pixel values of FIG. 7 are typically packed together as much as possible in order to increase resolution of the display.

There are four different types of pixel locations in the Bayer pattern of pixels of FIG. 6. First, there are pixel locations where red is sensed. Pixel location R33 is an example of such a pixel location. Second, there are pixel locations where blue is sensed. Pixel location B44 is an example of such a pixel location. Third, there are pixel locations where green is sensed, but where red is sensed in the adjacent pixel locations to the left and right. Pixel location G34 is an example of such a pixel location. Fourth, there are pixel locations where green is sensed, but where blue is sensed in the pixel locations to the left and right. Pixel location G43 is an example of such a pixel location. How all three color sub-pixel values (red, green, and blue) are determined for each of the four types of pixel locations is set forth below.

Red Pixel Location

At a red pixel location of interest, the red color sub-pixel value is the red sub-pixel value output by the image sensor for the pixel location of interest. For explanatory purposes, the red pixel location of interest is pixel location R33. The green sub-pixel value G33 for the pixel location of interest is determined as follows.

In a first step, a first directional color interpolation function F1 is applied to obtain a first missing color sub-pixel value $G33_1$ for the pixel location of interest. The first directional color interpolation function obtains the first missing color sub-pixel value using pixel information disposed principally along a first line L1. First line L1 extends in a first direction D1 through the pixel location of interest.

FIG. 8 illustrates first line L1 as a bold bidirectional arrow. In the present example, the first direction D1 is the vertical direction. The arrow therefore extends in the vertical direction through the pixel location of interest, G33. The first directional color interpolation function F1 is set forth below in Equation (1).

$$G33_1 = R33 + \frac{\left(G23 - \frac{R13+R33}{2}\right) + \left(G43 - \frac{R33+R53}{2}\right)}{2} \quad (1)$$

In a second step, a second directional color interpolation function F2 is applied to obtain a second missing color sub-pixel value $G33_2$ for the pixel location of interest. The second directional color interpolation function F2 obtains the second missing color sub-pixel value using pixel information disposed principally along a second line L2. Second line L2 extends in a second direction D2 through the pixel location of interest.

FIG. 9 illustrates second line L2 as a bold bidirectional arrow. In the present example, second direction D2 is the horizontal direction. The arrow therefore extends in the horizontal direction through the pixel location of interest, G33. The second directional color interpolation function F2 is set forth below in Equation (2).

$$G33_2 = R33 + \frac{\left(G32 - \frac{R31 + R33}{2}\right) + \left(G34 - \frac{R33 + R35}{2}\right)}{2} \qquad (2)$$

In a third step, a first metric V is obtained that is indicative of the presence of an edge extending in first direction D1. The magnitude of the metric does not indicates a binary distinction in that the magnitude indicates that an edge is either present or not present, rather the magnitude of the metric indicates a measure of a likelihood or a degree of confidence that an edge is present. In the present example, first direction D1 is the vertical direction. In the present example, the first metric V is given by Equation (3). The G23–G43 portion of the sum is a first order gradient component because it is a difference between a sub-pixel value on one side of the pixel location of interest and a sub-pixel value on the other side of the pixel location of interest. The 2·R33–R13–R53 portion of the sum is a second order gradient component. It is a difference of first order gradients. It is the difference between (R13–R33) and (R33–R53).

$$V = |2 \cdot R33 - R13 - R53| + |G23 - G43| \qquad (3)$$

In a fourth step, a second metric H is obtained that is indicative of the presence of an edge extending in second direction D2. In the present example, second direction D2 is the horizontal direction. In the present example, the second metric H is given by the Equation (4).

$$H = |2 \cdot R33 - R31 - R35| + |G32 - G34| \qquad (4)$$

In a fifth step, the first metric V and the second metric H are used to generate a first weighting factor k1 and a second weighting factor k2. In the present example, the first weighting factor k1 is obtained in accordance with the Equation (5).

$$k1 = \min(\max(0, \alpha \cdot (H-V) + 0.5), 1) \qquad (5)$$

In Equation (5), $\alpha$ is a constant. First, the maximum is taken of zero and $(\alpha \cdot (H-V)+0.5)$. The smallest this value can be is zero. Next, the minimum is taken of this value and one. The largest the result can be is one. It is therefore seen that Equation (5) forces the first weighting factor k1 to have a minimum value of zero and a maximum value of one. If $(\alpha \cdot (H-V)+0.5)$ is between zero and one, then k1 is equal to that value.

FIG. 10 illustrates the operation of Equation (5). In FIG. 10, the horizontal dimension represents the input value (H–V). In FIG. 10, the vertical dimension represents the value $(\alpha \cdot (H-V)+0.5)$. Note that the maximum of the output value $\min(\max(0, \alpha \cdot (H-V)+0.5), 1)$ is capped at one, and that the minimum of the output value is capped at zero. The constant $\alpha$ determines the slope of the line between the minimum capped value of zero and the maximum capped value of one.

The 0.5 value is a confidence factor value that is added to $(\alpha \cdot (H-V))$. If the confidence factor value is less than 0.5, then a midrange value of k1 will be reduced. If the confidence factor value is more than 0.5, then a midrange value k1 will be increased. A confidence factor value of 0.5 is neutral. If H equals V, then the first weighting factor k1 will be the midrange value of 0.5. Accordingly, the confidence factor value acts as a bias. If there is a greater confidence that the vertical interpolation estimate from Equation (1) will be closer to an ideal interpolated value in comparison to the horizontal interpolation estimate from Equation (2), then the confidence factor value should be made greater than the neutral value of 0.5.

The second weighting factor k2 is obtained from the first weighting factor k1 in accordance with Equation (6).

$$k2 = 1 - k1 \qquad (6)$$

The final missing color sub-pixel value G33 is then determined in accordance with the Equation (7).

$$G33 = k1 \cdot G33_1 + k2 \cdot G33_2 \qquad (7)$$

Although the determination of the first and second missing color sub-pixel values and the determinations of the first and second metrics are set forth above in a particular order, these determinations can be performed in other orders.

The missing blue color sub-pixel value B33 at the pixel location of interest is given by the Equation (8) below.

$$B33 = G33 + \frac{\begin{array}{c}(B22 - G22) + (B24 - G24) + \\ (B42 - G42) + (B44 - G44)\end{array}}{4} \qquad (8)$$

It is therefore seen that the number of full multiplication operations involved in obtaining the three color sub-pixel values R33, G33 and B33 is relatively small. In the determination of the first weighting factor k1, a full multiplication of $\alpha$ and (H–V) is performed. In the determination of G33, k1 is multiplied by $G33_1$ and k2 is multiplied by $G33_2$. The divisions and other multiplications are simple divisions and multiplications by factors of two. Dividing or multiplying by a factor of two involves a relatively simple shift operation and is not therefore considered a full multiplication operation.

Blue Pixel Location

Consider next the situation in which the pixel location of interest is a blue pixel location. The blue color sub-pixel value for this pixel location of interest is simply the blue sub-pixel value output by the image sensor for the pixel location. For explanatory purposes, the blue pixel location of interest is pixel location B44. The green color sub-pixel value G44 for the pixel location of interest is determined as follows.

In a first step, a first directional color interpolation function F1 is applied to obtain a first missing color sub-pixel value for the pixel location of interest. The first directional color interpolation function F1 obtains the first missing color sub-pixel value using pixel information disposed principally along a first line L1. First line L1 extends in a first direction D1 through the pixel location of interest. In the present example, the first directional color interpolation function F1 is set forth below in Equation (9).

$$G44_1 = B44 + \frac{\left(G34 - \frac{B24 + B44}{2}\right) + \left(G54 - \frac{B44 + B64}{2}\right)}{2} \qquad (9)$$

In a second step, a second directional color interpolation function F2 is applied to obtain a second missing color sub-pixel value for the pixel location of interest. The second directional color interpolation function F2 obtains the second missing color sub-pixel value using pixel information disposed principally along a second line L2. Second line L2 extends in a second direction D2 through the pixel location of interest. In the present example, the second directional color interpolation function F2 is set forth below in Equation (10).

$$G44_2 = B44 + \frac{\left(G43 - \frac{B42 + B44}{2}\right) + \left(G45 - \frac{B44 + B46}{2}\right)}{2} \quad (10)$$

In a third step, a first metric V is obtained that is indicative of the presence of an edge extending in first direction D1. In the present example, first direction D1 is the vertical direction. In the present example, the first metric V is given by Equation (11).

$$V = |2 \cdot B44 - B24 - B64| + |G34 - G54| \quad (11)$$

In a fourth step, a second metric H is obtained that is indicative of the presence of an edge extending in second direction D2. In the present example, the second direction D2 is the horizontal direction. In the present example, the second metric H is given by the Equation (12).

$$H = |2 \cdot B44 - B42 - B46| + |G43 - G45| \quad (12)$$

In a fifth step, the first and second metrics are used to generate a first weighting factor k1 and a second weighting factor k2. In the present example, the first weighting factor k1 is obtained in accordance with the Equation (13).

$$k1 = \min(\max(0, \alpha \cdot (H-V) + 0.5), 1) \quad (13)$$

In Equation (13), $\alpha$ is a constant. First, the maximum is taken of zero and ($\alpha \cdot$(H−V)+0.5). The smallest this value can be is zero. Next, the minimum is taken of this value and one. The largest the result can be is one. It is therefore seen that Equation (13) forces the first weighting factor k1 to have a minimum value of zero and a maximum value of one. If ($\alpha \cdot$(H−V)+0.5) is between zero and one, then k1 is equal to that value. FIG. 10 illustrates the operation of Equation (13).

The second weighting factor k2 is obtained from the first weighting factor k1 in accordance with Equation (14).

$$k2 = 1 - k1 \quad (14)$$

The final missing color sub-pixel value G44 is then determined in accordance with the Equation (15).

$$G44 = k1 \cdot G44_1 + k2 \cdot G44_2 \quad (15)$$

The missing red color sub-pixel value R44 at the pixel location of interest is given by the Equation (16) below.

$$R44 = G44 + \frac{(R33 - G33) + (R35 - G35) + (R53 - G53) + (R55 - G55)}{4} \quad (16)$$

Green Pixel Location Between Red Pixel Locations

Consider next the situation in which the pixel location of interest is a green pixel location, where there are red pixel locations to the left and right of the pixel location of interest. For illustrative purposes, consider the example in which the pixel location of interest is G34. The missing red color sub-pixel value R34 is determined using red and green pixel values in accordance with Equation (17) below.

$$R34 = G34 + \frac{(R33 - G33) + (R35 - G35)}{2} \quad (17)$$

The missing blue color sub-pixel value B34 at the pixel location of interest is given by the Equation (18) below.

$$B34 = G34 + \frac{(B24 - G24) + (B44 - G44)}{2} \quad (18)$$

Green Pixel Location Between Blue Pixel Locations

Consider next the situation in which the pixel location of interest is a green pixel location, where there are blue pixel locations to the left and right of the pixel location of interest. For illustrative purposes, consider the example in which the pixel location of interest is G43. The missing red color sub-pixel value R43 is determined using red and green pixel values in accordance with Equation (19) below.

$$R43 = G43 + \frac{(R33 - G33) + (R53 - G53)}{2} \quad (19)$$

The missing blue color sub-pixel value B34 at the pixel location of interest is given by the Equation (18) below.

$$B43 = G43 + \frac{(B42 - G42) + (B44 - G44)}{2} \quad (20)$$

In the method of determining the red, green and blue sub-pixel values set forth above, the directional color interpolation functions are directional color difference functions. Consider, for example, the function of Equation (21) below.

$$G33_1 = R33 + \frac{\left(G23 - \frac{R13 + R33}{2}\right) + \left(G43 - \frac{R33 + R53}{2}\right)}{2} \quad (21)$$

The term in the numerator to the left is a measure of a color difference between green and red at pixel location G23. The green color sub-pixel value at pixel location G23 is G23. There is, however, no red sub-pixel value at pixel location G23. Consequently, an average of the adjacent red color sub-pixel values R13 and R33 is used.

The term in the numerator to the right is a measure of a color difference between green and red at pixel location G43. The green color sub-pixel value at pixel location G43 is G43. There is, however, no red sub-pixel value at pixel location G43. Consequently, an average of the adjacent red color sub-pixel values R33 and R53 is used.

The pixel locations G23 and G43 are located above and below the pixel of interest G33. The two terms in the numerator (color differences) are averaged. The result is an average of the color difference above and below the pixel of interest G33. This color difference average is to be equal to the color difference G33−R33 between green and red at the pixel location of interest G33. In Equation (21), the R33 term has been moved from the left side of the equation to the right side of the equation. Equation (21) therefore selects G33 such that the color difference between green and red at pixel locations G23, R33 and G43 is the same. The three pixel locations G23, R33 and G43 extend along a line in the vertical direction and extend through the pixel location of interest, G33.

Equation (8) used in the determination of color sub-pixel B33 uses green sub-pixel values G22, G24, G42 and G44. The corresponding four pixel locations B22, B24, B42 and B44 are, however, blue pixel locations for which the Bayer format data includes no green sub-pixel values. Similarly, Equation (16) used in the determination of color sub-pixel R44 uses green sub-pixel values G33, G35, G53 and G55. The corresponding four pixel locations R33, R35, R53 and R55 are, however, red pixel locations for which the Bayer format data includes no green sub-pixel values. Equation (17) used in the determination of color sub-pixel R34 uses green sub-pixel values G33 and G35. The corresponding two pixel locations R33 and R35 are, however, red pixel locations for which the Bayer format data includes no green sub-pixel values. Equation (18) used in the determination of color sub-pixel B34 uses green sub-pixel values G24 and G44. The corresponding two pixel locations B24 and B44 are, however, blue pixel locations for which the Bayer format data includes no green sub-pixel values. Equation (19) used in the determination of color sub-pixel R43 uses green sub-pixel values G33 and G53. The corresponding two pixel locations R33 and R53 are, however, red pixel locations for which the Bayer format data includes no green sub-pixel values. Equation (20) used in the determination of color sub-pixel B43 uses green sub-pixel values G42 and G44. The corresponding two pixel locations B42 and B44 are, however, blue pixel locations for which the Bayer format data includes no green sub-pixel values.

Accordingly, green sub-pixel values can be calculated for all the blue and red pixel locations in the entire array of FIG. 6 in a first step. Then, once a green sub-pixel value is known for each pixel location, those green sub-pixel values are used to determine the other missing red and blue sub-pixel values using the Equations (8), (16), (17), (18), (19) and (20) above.

Alternatively, green sub-pixel values are not calculated for all the blue and red pixel locations of the entire array before the calculation of missing red and missing blue sub-pixel values begins. The calculation of a red or blue missing color sub-pixel value only requires green sub-pixel values in an adjacent neighboring area to the missing color sub-pixel to be calculated. Accordingly, the calculation of green sub-pixel values occurs so that the pixel of interest (for purposes of calculating green sub-pixel values) passes through the array of pixel locations. The calculation of red and blue sub-pixel values occurs in a similar fashion with the pixel of interest (for purposes of calculating red and blue sub-pixel values) moving through the array of pixel locations. The pixel of interest for purposes of calculating red and blue sub-pixel values, however, lags the pixel of interest for purposes of calculating green sub-pixel values. As a consequence, previously generated green sub-pixel values can be buffered and made available for use in the following calculation of red and blue sub-pixel values.

Figures 11, 12:
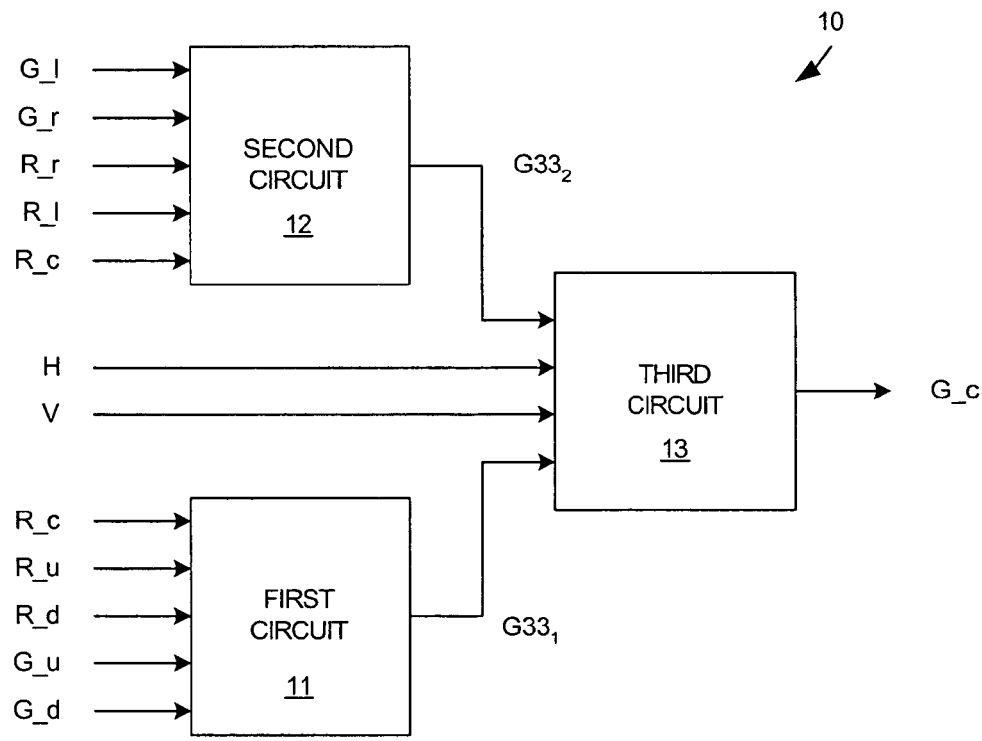
FIG. 11 is a block diagram of a hardware apparatus 10 for carrying out a novel color interpolating method. The hardware apparatus can be embodied in a battery-powered electronic consumer device such as a cell phone. The hardware apparatus advantageously includes only one full multiplier circuit.
FIG. 12 is a diagram of Bayer pixel locations labeled for understanding in connection with the hardware apparatus 10 of FIG. 11.

FIG. 11 is a block diagram of a hardware apparatus 10 that outputs a missing green sub-pixel value G_c. The missing green sub-pixel value in this example is a missing green sub-pixel value for the pixel location at the intersection of the third row and third column of the Bayer pattern of FIG. 12.

FIG. 12 is a diagram of a two-dimensional array sensors organized in a Bayer pattern. Each sensor is located at a pixel location. The "_c", "_l", "_r", "_u", "_d", "_ul", "_ur", "_ll" and "_lr" notation indicates center, left, right, up, down, upper left, upper right, lower left and lower right, respectively. These relative locations are locations relative to the pixel of interest, R_c in row three and column three. The Bayer format image sensor captures an image and outputs pixel values to a buffer memory. The sensor outputs one sub-pixel value for each of the pixel locations of FIG. 12. The buffer memory in turn supplies the sub-pixel values indicated by the labels along the left edge of FIG. 11 to the hardware apparatus of FIG. 11. Each of the sub-pixel values at the left edge of FIG. 11 is supplied to the hardware apparatus of FIG. 11 in parallel fashion at the same time.

There are two values at the left edge of FIG. 11 that are not sub-pixel values. These values are a first metric value H and a second metric value V. First metric H is a value indicative of the presence of an edge extending in the horizontal dimension. Second metric V is a value indicative of the presence of an edge extending in the vertical dimension.

Hardware apparatus 10 includes a first circuit 11, a second circuit 12, and a third circuit 13. First circuit 11 implements Equation (1), performs vertical interpolation, and generates a first missing color sub-pixel value $G33_1$. Second circuit 12 implements Equation (2), performs horizontal interpolation, and generates a second missing color sub-pixel value $G33_2$. Third circuit 13 receives $G33_1$, $G33_2$, the first metric H, and the second metric V and generates the missing green color sub-pixel value G_c for the pixel location of interest.

Figure 13:
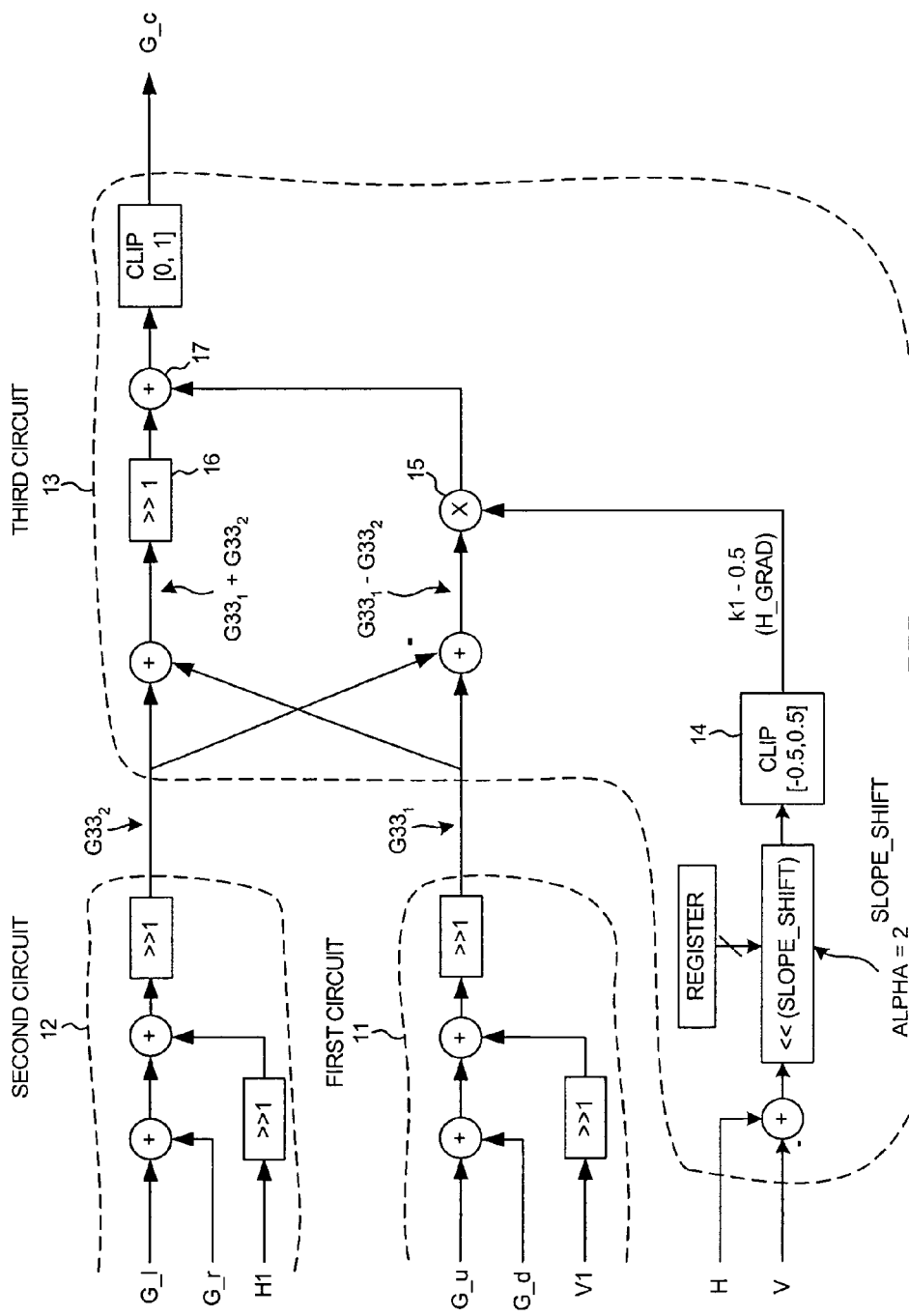
FIG. 13 is a detailed diagram of the third circuit 13 of the hardware apparatus 10 of FIG. 11.

FIG. 13 illustrates third circuit 13 in further detail. In FIG. 13, the circular symbol containing a plus sign is a symbol for a hardware adder. In some places a negative sign appears by the arrowhead of a bus where the arrowhead extends into an adder symbol. This negative sign indicates a negative version of the value on the incoming bus. The adder is therefore adding a negative value and is therefore performing a subtraction operation. In FIG. 13, the circular symbol containing an "X" is a symbol for a hardware multiplier. In FIG. 13, a block labeled ">>1" indicates a shift right of one bit position. This is accomplished by shifting the bit lines of the bus carrying the incoming value one bit position. The effect of such a right shift is a divide by two operation. In FIG. 13, the block labeled "<<(slope_shift)" performs a shift left operation where the number of shifts performed is determined by a predetermined variable "slope_shift". This variable may, for example, be set by writing a register (not shown) within the circuit of FIGS. 11 and 13. The value α is equal to two to the power "slope-shift". In FIG. 13, block 14 labeled "clip" operates to clip the magnitude of the output value called "H_GRAD" between −0.5 and 0.5. The value H_GRAD is equal to the difference (k1−0.5), where k1 is the first weighting factor.

In FIG. 13, note that there is only one circular multiplier symbol. It is the full multiplier circuit 15 that multiplies the value H_GRAD by $(G33_1-G33_2)$. Rather than calculating G33 by multiplying the first weighting factor by $G33_1$ and also multiplying the second weighting factor by $G33_2$, and then adding the two products to obtain G33, the circuit of FIGS. 11 and 13 advantageously calculates G33 with only one full multiplier circuit (other than simple bit-shifting circuitry). The calculation performed to obtain G33 is given by Equation (22) below.

$$G33 = H\_GRAD(G33_1 - G33_2) + 0.5(G33_1 + G33_2) \qquad (22)$$

Equation (22) is derived by the flow of equations below.

$$G33 = k1 G33_1 + k2 G33_2 \qquad (23)$$

Substituting (1−k1) for k2 yields Equation (24) below.

$$G33 = k1 G33_1 + (1-k1) G33_2 \qquad (24)$$

Rearranging Equation (24) yields Equation (25) below.

$$G33 = k1(G33_1 - G33_2) + G33_2 \qquad (25)$$

Substituting (H_GRAD+0.5) for k1 yields Equation (26) below.

$$G33 = (H\_GRAD+0.5) G33_1 + (0.5 - H\_GRAD) G33_2 \qquad (26)$$

Rearranging Equation (26) yields Equation (22) set forth above. In the uppermost left to right flow of FIG. 13, block 16 operates to shift the value (G33$_1$+G33$_2$) right by one bit. This performs the multiply by 0.5 operation of the right side of Equation (22). In the center left to right flow of FIG. 13, the value (G33$_1$−G33$_2$) is multiplied by the value H_GRAD (using the full hardware multiplier represented by the circular symbol labeled 15). The full hardware multiplier 15 performs the multiply operation of the left side of Equation (22). The outputs of the upper and center flows of FIG. 13 are summed together by adder 17 to perform the summing operation of Equation (22).

The values H1 and V1 that appear at the left of FIG. 13 are intermediate values. H1 is generated within second circuit 12. V1 is generated within first circuit 11.

H1 is generated by supplying R_r and R_l to a first adder circuit to generate a sum. The opposite of the sum is supplied to a first input of a second adder. The value 2*R_c is supplied to a second input of the second adder. The output of the second adder is the value H1. Value H1 is supplied to the circuitry of FIG. 13. The value 2*R_c represents the pixel value R_c multiplied by two. The value 2*R_c is obtained by shifting the bit lines of the bus carrying value R_c one place to the left.

V1 is generated by supplying R_u and R_d to a first adder circuit to generate a sum. The opposite of the sum is supplied to a first input of a second adder. The value 2*R_c is supplied to a second input of the second adder. The output of the second adder is the value V1. Value V1 is supplied to the circuitry of FIG. 13.

The horizontal metric H supplied to the circuitry of FIG. 13 is generated from pixel values received from the buffer memory as follows. The opposite of G_r is supplied to a first input of a first adder. G_l is supplied to a second input of the first adder. The output of the first adder is supplied to a first absolute value circuit. The output of the first absolute value circuit is supplied to a first input of a second adder. Value H1 is supplied to a second absolute value circuit. The output of the second absolute value circuit is supplied to a second input of the second adder. The output of the second adder is the horizontal metric H.

The vertical metric V supplied to the circuitry of FIG. 13 is generated from pixel values received from the buffer memory as follows. The opposite of G_d is supplied to a first input of a first adder. G_u is supplied to a second input of the first adder. The output of the first adder is supplied to a first absolute value circuit. The output of the first absolute value circuit is supplied to a first input of a second adder. Value V1 is supplied to a second absolute value circuit. The output of the second absolute value circuit is supplied to a second input of the second adder. The output of the second adder is the vertical metric V.

In one example of hardware apparatus 10, the generated green sub-pixel value G_c is written into a frame memory (not shown). The frame memory is part of an SDRAM integrated circuit. The buffer memory and the circuitry of FIGS. 11 and 13 is part of a digital image pipeline (DIP) part of a baseband processor integrated circuit. The image sensor, the baseband processor integrated circuit, and the SDRAM frame memory are embodied in a cellular telephone. Pixel values output from the image sensor pass from the image sensor and into the buffer memory within the baseband processor integrated circuit. The circuitry of FIGS. 11 and 13 operates on pixel values in the buffer memory and writes the resulting color interpolated sub-pixel values into the SDRAM frame memory.

The third and last sub-pixel value for the pixel of interest in the third row and third column is a blue sub-pixel value. This blue sub-pixel value B33 is generated by hardware circuitry that implements Equation (8). As indicated by Equation (8), interpolation of blue sub-pixel value B33 requires as inputs interpolated green pixel values. Accordingly, the needed interpolated green sub-pixel values are read back from the frame memory after the circuitry of FIGS. 11 and 13 wrote the green sub-pixel values into the frame memory. The interpolated green sub-pixel values that are read back from the frame memory are then used in the generation of the missing blue sub-pixel value B33 for the pixel of interest.

In another example of hardware apparatus 10, the interpolated green sub-pixel values output from the circuit of FIGS. 11 and 13 are buffered in line buffers (not shown) in the baseband processor integrated circuit. The interpolated green sub-pixel values in the line buffers are then used to generate the missing blue sub-pixel value. In the calculation of the missing blue sub-pixel value, green sub-pixel values one or a few lines ahead of the blue sub-pixel being determined are needed. Not all green sub-pixels of the entire image frame are needed. Accordingly, only one or a few lines of green sub-pixel values are stored on the baseband processor in line buffers. After green sub-pixels in the line buffers are used in the calculation of missing sub-pixel values, then those green sub-pixel values are transferred from the baseband processor integrated circuit to the external SDRAM frame memory. The flow of green sub-pixels through the line buffers is therefore similar to the way data flows through a first-in-first-out (FIFO) memory. Newly interpolated green sub-pixel values are pushed into the line buffers, thereby causing green sub-pixel values that are no longer needed to be output from the line buffers and to be transferred to the external SDRAM frame memory.

If the pixel location of interest were not a red pixel location as in the example above but rather were a blue pixel location, then the missing red sub-pixel value would be generated by hardware that implements the operation of Equation (16). As indicated by Equation (16), interpolated green sub-pixel values are required as inputs. The needed interpolated green sub-pixel values would be retrieved from the frame memory after the circuitry of FIGS. 11 and 13 wrote the interpolated green sub-pixel values into the frame memory.

The pixel location of interest moves through the two-dimensional array of FIG. 12 such that missing blue and red sub-pixel values are generated using any needed previously determined green sub-pixel values. The blue and red missing sub-pixel values so generated are written into external SDRAM frame memory. After all the color interpolation of the incoming Bayer pixel values for the captured image has been performed, the external SDRAM frame memory contains three color sub-pixel values for each pixel location. The processing is performed by dedicated hardware logic and not by a processor executing a sequence of instructions. The hardware apparatus of FIGS. 11 and 13 operates in a pipeline fashion such that a substantially constant stream of Bayer pattern pixel information is being processed by the circuitry such that a corresponding substantially constant stream of color interpolated sub-pixel values is output from the hardware apparatus.

Although a pipelined hardware apparatus is described above for illustrative purposes, the novel color interpolation method can also be performed in software by a processor executing instructions. In one embodiment, the processor is the central processing unit (CPU) of a personal computer. Raw pixel data from an image sensor is supplied to the personal computer. Application layer software executing on the personal computer performs the novel color interpolation method, thereby generating color interpolated image data. The color interpolated image data can, for example, then undergo further image processing by software (the same application or another application) running on the personal computer. Software instructions that perform the novel color interpolation method can, for example, be incorporated into an image processing software package such as Adobe Photoshop.

Although certain specific embodiments are described above for instructional purposes, the present invention is not limited thereto. Although a final missing color sub-pixel value is a weighted sum of two interpolated missing color sub-pixel values in some embodiments, the final missing color sub-pixel value can be a weighted sum of more than two interpolated missing color sub-pixel values. For example, three different missing color sub-pixel values can be determined for a pixel location of interest. Each of the three missing color sub-pixel values can be multiplied by its own weighting factor to obtain a product. Three such products are obtained and these three products are summed to obtain the final missing color sub-pixel value. One or more confidence factors can be applied in the determination of the three weighting factors. Although a final missing color sub-pixel value may be determined by actually determining weighting factors and then multiplying them by corresponding missing color sub-pixel values for a pixel location of interest, the very same final missing color sub-pixel value can sometimes be determined without actually determining the weighting factors. The very same final missing color sub-pixel value is obtained, but the steps involved in calculating the final missing color sub-pixel value do not require all the weighting factors to be explicitly present. Although the specific embodiment is described above in connection with the incoming pixel values being in the Bayer pattern, the incoming pixels can be in other patterns that require color interpolation.

Although a specific embodiment is described above in connection with a particular first directional color interpolation function and a particular second directional color interpolation function, other first and second directional color interpolation functions can be employed. For example, where the first directional color interpolation function is a vertical interpolation function, the missing color sub-pixel value for a particular color can be an average of the sub-pixel values for that particular color in the pixel locations immediately above the pixel location of interest and immediately below the pixel location of interest. Where the second directional color interpolation function is a horizontal interpolation function, the missing color sub-pixel value for the particular color can be an average of the sub-pixel values for that particular color in the pixel locations immediately to the left of the pixel location of interest and immediately to the right of the pixel location of interest. Accordingly, the examples of directional color interpolation functions set forth in the description above are presented for illustrative purposes. Other first and second directional interpolation functions can be employed.

Although a specific embodiment is described above in connection with a first metric that is determined in a first way and in connection with a second metric that is determined in a second way, other ways of determining the first and second metrics can be employed. For example, a first metric that is indicative of the presence of en edge extending in the vertical direction can be the absolute value of the difference between a sub-pixel value of a particular color adjacent and to the left of the pixel location of interest and a sub-pixel value of the particular color adjacent and to the right of the pixel location of interest. Similarly, a second metric that is indicative of the presence of an edge extending in the horizontal direction can be the absolute value of the difference between a sub-pixel value of a particular color adjacent and above the pixel location of interest and a sub-pixel value of the particular color adjacent and below the pixel location of interest. Accordingly, the examples of metric functions set forth in the description above are presented for illustrative purposes. Other functions for generating the first and second metrics can be employed.

Although the function for determining a weighting factor is described above in connection with a function whose output varies linearly with respect to a difference between the first and second metrics (over a function output range between zero and one) as illustrated in FIG. 10, other functions for determining a weighting factor can be employed. For example, a function of the first and second metrics can be employed whose output varies non-linearly with respect to a difference between the first and second metrics. The minimum and maximum output of the function can be clipped at values other than zero and one, respectively.

Various modifications, adaptations, and combinations of the various features of the described specific embodiments can be practiced without departing from the scope of the invention as set forth in the claims.

What is claimed is:

1. A method of color interpolating a final missing color sub-pixel value, the final missing color sub-pixel value being a sub-pixel value for a pixel location of interest, the method comprising:

using a first directional color interpolation function to obtain a first missing color sub-pixel value for the pixel location of interest, wherein the first directional color interpolation function obtains the first missing color sub-pixel value using pixel information disposed principally along a first line, the first line extending in a first direction through the pixel location of interest;

using a second directional color interpolation function to obtain a second missing color sub-pixel value for the pixel location of interest, wherein the second directional color interpolation function obtains the second missing color sub-pixel value using pixel information disposed principally along a second line, the second line extending in a second direction through the pixel location of interest;

obtaining a first metric indicative of the presence of an edge extending in the first direction;

obtaining a second metric indicative of the presence of an edge extending in the second direction; and using the first and second metrics to generate the final missing color sub-pixel value, the final missing color sub-pixel value being substantially equal to a weighted sum of the first missing color sub-pixel value and the second missing color sub-pixel value, the weighted sum having a first missing color sub-pixel value component and a second missing color sub-pixel value component, wherein a relative proportion of the first missing color sub-pixel value component versus the second missing color sub-pixel value component is a function of the first and second metrics, wherein the first missing color sub-pixel value is a sub-pixel value of a first color, wherein an image sensor outputs a sub-pixel value of a second color for the pixel location of interest, and wherein the first directional color interpolation function involves determining the first missing color sub-pixel value such that a color difference between the first missing color sub-pixel value of the first color and the sub-pixel value of the second color output by the image sensor substantially matches an average of color differences between sub-pixels of the first and second colors for pixel locations disposed along the first line.

2. The method of claim 1, wherein using the first and second metrics to generate the final missing color sub-pixel value comprises:
  using the first and second metrics to generate a first weighting factor and a second weighting factor;
  multiplying the first missing color sub-pixel value by the first weighting factor to obtain a first product;
  multiplying the second color sub-pixel value by the second weighting factor to obtain a second product; and
  summing the first and second products together to obtain the final missing color sub-pixel value.

3. The method of claim 2, wherein at least one of the first metric and the second metric are obtained using an at least one absolute value circuit to determine an absolute value of a first order gradient component and an absolute value of a second order gradient component.

4. The method of claim 3, wherein using the first and second metrics to generate a first weighting factor and a second weighting factor involves determining the first weighting factor (denoted k1), the first weighting factor satisfying the equation:

$$k1 = \min(\max(0, \alpha \cdot (H-V) + 0.5), 1)$$

wherein $\alpha$ is a constant, and wherein the second weighting factor (denoted k2) satisfies the equation:

$$k2 = 1 - k1.$$

5. The method of claim 1, wherein an image sensor outputs a sub-pixel value of a first color for the pixel location of interest, and wherein the second and third missing color sub-pixels values are of a second color, and wherein the final missing color sub-pixel value is of the second color.

6. The method of claim 1, wherein the first directional color interpolation function is a color difference function, and wherein the second directional color interpolation function is a color difference function.

7. The method of claim 1, wherein the second missing color sub-pixel value is a sub-pixel value of the first color, and wherein the second directional color interpolation function involves determining the second missing color sub-pixel value such that a color difference between the second missing color sub-pixel value of the first color and the sub-pixel value of the second color output by the image sensor substantially matches an average of color differences between sub-pixels of the first and second colors for pixel locations disposed along the second line.

8. The method of claim 1, wherein the first missing color sub-pixel value is a green sub-pixel value Gnm, wherein an image sensor outputs a red sub-pixel value Rnm for the pixel location of interest, wherein the first letter in the notation Gnm indicates the color of the sub-pixel such that G indicates green and R indicates red, wherein the first number following the first letter in the notation Gnm indicates a pixel location row in which the sub-pixel is located, and wherein the second number in the notation Gnm indicates a pixel location column in which the sub-pixel is located, and wherein the first directional color interpolation function is denoted $Gnm_1$ and satisfies the equation:

$$Gnm_1 = Rnm + \frac{\left(\left(G(n-1)m - \frac{R(n-2)m + Rnm}{2}\right) + \left(G(n+1)m - \frac{Rnm + R(n+2)m}{2}\right)\right)}{(2)}$$

and wherein the second directional color interpolation function is denoted $Gnm_2$ and satisfies the equation:

$$Gnm_2 = Rnm + \frac{\left(\left(Gn(m-1) - \frac{Rn(m-2) + Rnm}{2}\right) + \left(Gn(m+1) - \frac{Rnm + Rn(M+2)}{2}\right)\right)}{(2)}.$$

9. The method of claim 1, wherein the first missing color sub-pixel value is a green sub-pixel value Gnm, wherein an image sensor outputs a red sub-pixel value Rnm for the pixel location of interest, wherein the first letter in the notation Gnm indicates the color of the sub-pixel such that G indicates green and R indicates red, wherein the first number following the first letter in the notation Gnm indicates a pixel location row in which the sub-pixel is located, and wherein the second number in the notation Gnm indicates a pixel location column in which the sub-pixel is located, and wherein the first metric (denoted V) satisfies the equation:

$$V = |2 \cdot R33 - R13 - R53| + |G23 - G43|$$

and wherein the second metric (denoted H) satisfies the equation:

$$H = |2 \cdot R33 - R31 - R35| + |G32 - G34|.$$

10. The method of claim 1, wherein the first directional color interpolation function obtains the first missing color sub-pixel value using information disposed entirely along the first line, and wherein the second directional color interpolation function obtains the second missing color sub-pixel value using information disposed entirely along the second line.

11. A computer-readable medium storing a set of computer-executable instructions, the set of computer-executable instructions being for color interpolating a final missing color sub-pixel value, the final missing color sub-pixel value being a sub-pixel value for a pixel location of interest, the set of computer-executable instructions being for:
  using a first directional color interpolation function to generate a first missing color sub-pixel value for the pixel location of interest, wherein the first directional color interpolation function generates the first missing color sub-pixel value using pixel information disposed principally along a first line, the first line extending in a first direction through the pixel location of interest;
  using a second directional color interpolation function to generate a second missing color sub-pixel value for the pixel location of interest, wherein the second directional color interpolation function generates the second missing color sub-pixel value using pixel information disposed principally along a second line, the second line extending in a second direction through the pixel location of interest;
  generating a first metric indicative of the presence of an edge extending in the first direction;
  generating a second metric indicative of the presence of an edge extending in the second direction; and
  using the first and second metrics to generate the final missing color sub-pixel value, the final missing color sub-pixel value being substantially equal to a weighted sum of the first missing color sub-pixel value and the second missing color sub-pixel value, the weighted sum having a first missing color sub-pixel value component and a. second missing color sub-pixel value component, wherein a relative proportion of the first missing color sub-pixel value component versus the second missing color sub-pixel value component is a function of the first and second metrics, wherein the first missing color sub-pixel value is a sub-pixel value of a first color, wherein an image sensor outputs a sub-pixel value of a second color for the pixel location of interest, and wherein the first directional color interpolation function involves determining the first missing color sub-pixel value such that a color difference between the first missing color sub-pixel value of the first color and the sub-pixel value of the second color output by the image sensor substantially matches an average of color differences between sub-pixels of the first and second colors for pixel locations disposed along the first line.

12. An apparatus that receives a plurality of sensor pixel values, each of the plurality of sensor pixel values corresponding to a pixel location of a two-dimensional array of pixel locations, one of the pixel locations being a pixel location of interest, the apparatus generating a final missing color sub-pixel value for the pixel location of interest, the apparatus comprising:
  a first circuit that receives a first plurality of sensor pixel values, the first plurality of sensor pixel values being sensor pixel values for pixel locations disposed principally along a first line, the first line extending in a first direction through the pixel location of interest, the first circuit outputting a first missing color sub-pixel value for the pixel of interest;
  a second circuit that receives a second plurality of sensor pixel values, the second plurality of sensor pixel values being sensor pixel values for pixel locations disposed principally along a second line, the second line extending in a second direction through the pixel location of interest, the second circuit outputting a second missing color sub-pixel value for the pixel of interest; and
  a third circuit that receives a first metric, that receives a second metric, that receives the first missing color sub-pixel value from the first circuit and that receives the second missing color sub-pixel value from the second circuit, the third circuit outputting the final missing color sub-pixel value, the final missing color sub-pixel value being substantially equal to a weighted sum of the first missing color sub-pixel value and the second missing color sub-pixel value, the weighted sum having a first missing color sub-pixel value component and a second missing color sub-pixel value component, wherein a relative proportion of the first missing color sub-pixel value component versus the second missing color sub-pixel value component is a function of the first and second metrics, wherein the third circuit comprises an adder that outputs a value equal to a difference between the first metric and the second metric.

13. The circuit of claim 12, wherein the first metric is indicative of the presence of an edge extending in the first direction, and wherein the second metric is indicative of the presence of an edge extending in the second direction.

14. The circuit of claim 12, wherein the third circuit comprises a first adder and a second adder, the first adder outputting a value equal to a sum of the first missing color sub-pixel value and the second missing color sub-pixel value, the second adder outputting a value equal to a difference between the first missing color sub-pixel value and the second missing color sub-pixel value.

15. The circuit of claim 12, wherein the third circuit comprises a multiplier.

16. The circuit of claim 12, wherein the first circuit, the second circuit and the third circuit operate in a pipeline fashion such that the third circuit outputs a stream of interpolated missing color sub-pixel values.

17. The circuit of claim 12, wherein the third circuit generates a value equal to a difference between the first metric and the second metric, and wherein the third circuit multiplies the value by a predetermined variable.

18. An apparatus that receives a plurality of sensor pixel values, each of the plurality of sensor pixel values corresponding to a pixel location of a two-dimensional array of pixel locations, one of the pixel locations being a pixel location of interest, the apparatus generating a final missing color sub-pixel value for the pixel location of interest, the apparatus comprising:
  a first circuit that receives a first plurality of sensor pixel values, the first plurality of sensor pixel values being sensor pixel values for pixel locations disposed principally along a first line, the first line extending in a first direction through the pixel location of interest, the first circuit outputting a first missing color sub-pixel value for the pixel of interest;
  a second circuit that receives a second plurality of sensor pixel values, the second plurality of sensor pixel values being sensor pixel values for pixel locations disposed principally along a second line, the second line extending in a second direction through the pixel location of interest, the second circuit outputting a second missing color sub-pixel value for the pixel of interest; and
  means for receiving a first metric, a second metric, the first missing color sub-pixel value and the second missing color sub-pixel value, and for outputting the final missing color sub-pixel value, the final missing color sub-pixel value being substantially equal to a weighted sum of the first missing color sub-pixel value and the second missing color sub-pixel value, the weighted sum having a first missing color sub-pixel value component and a second missing color sub-pixel value component, wherein a relative proportion of the first missing color sub-pixel value component versus the second missing color sub-pixel value component is a function of the first and second metrics, wherein the means includes only one full multiplier circuit.

19. The apparatus of claim 18, wherein the means includes bit-shifting circuitry.

20. The apparatus of claim 18, wherein the means generates a value equal to a difference between the first metric and the second metric, and wherein the means multiplies the value by a predetermined variable, and wherein the predetermined variable can be changed by writing to a register within the means.

* * * * *

UNITED STATES PATENT AND TRADEMARK OFFICE
CERTIFICATE OF CORRECTION

PATENT NO. : 7,576,783 B2  Page 1 of 1
APPLICATION NO. : 11/051159
DATED : August 18, 2009
INVENTOR(S) : Hwang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1062 days.

Signed and Sealed this

Seventh Day of September, 2010

David J. Kappos
*Director of the United States Patent and Trademark Office*